(12) United States Patent
Scully (10) Patent No.: US 7,925,559 B2
(45) Date of Patent: Apr. 12, 2011

(54) COMPUTER SYSTEM FOR APPLYING PROACTIVE REFERRAL MODEL TO LONG TERM DISABILITY CLAIMS

(75) Inventor: Timothy J. Scully, Albertville, MN (US)

(73) Assignee: Hartford Fire Insurance Company, Hartford, CT (US)

( * ) Notice: Subject to any disclaimer, the term of this patent is extended or adjusted under 35 U.S.C. 154(b) by 410 days.

(21) Appl. No.: 12/196,532

(22) Filed: Aug. 22, 2008

(65) Prior Publication Data

US 2010/0049551 A1    Feb. 25, 2010

(51) Int. Cl.
*G06Q 40/00*    (2006.01)
(52) U.S. Cl. ............................................. 705/35; 705/37
(58) Field of Classification Search ............... 705/1–60; 726/1–22; 370/338–388
See application file for complete search history.

(56) References Cited

U.S. PATENT DOCUMENTS

| | | | |
|---|---|---|---|
| 5,557,515 A | 9/1996 | Abbruzzese et al. | |
| 5,819,226 A | 10/1998 | Gopinathan et al. | |
| 6,253,186 B1 | 6/2001 | Pendleton, Jr. | |
| 6,714,918 B2 | 3/2004 | Deshpande et al. | |
| 7,089,592 B2 | 8/2006 | Adjaoute | |
| 7,263,492 B1 | 8/2007 | Suresh et al. | |
| 2003/0158751 A1 | 8/2003 | Suresh et al. | |
| 2005/0043961 A1 | 2/2005 | Torres et al. | |
| 2005/0276401 A1 | 12/2005 | Madill, Jr. et al. | |
| 2006/0041464 A1 | 2/2006 | Powers et al. | |
| 2010/0153330 A1* | 6/2010 | Desikachari | 706/59 |

OTHER PUBLICATIONS

Jonathan Clark, Fraud Investigation A Claims Handler's Guide, Summer 2006, Crawford, web, 1-77.*

* cited by examiner

*Primary Examiner* — Mary Cheung
*Assistant Examiner* — Marissa Liu
(74) *Attorney, Agent, or Firm* — Buckley, Maschoff & Talwalkar LLC (57) ABSTRACT

A computer system includes a data storage module. The data storage module receives, stores, and provides access to data related to long term disability claims. A proactive referral model component is coupled to the data storage module, and determines whether to refer a current claim to an investigation unit. The proactive referral model is based on at least two of the following variables: (a) a variable that indicates that the claimant's diagnosis has changed; (b) a variable that indicates that the current claim in question was brought under any-occupation coverage; (c) a variable that reflects a market segment for a policy under which the current claim in question was brought; (d) a variable that has a value based on a state in which the claimant resides; and (e) a variable that represents an amount of experience of a claims handler who handled the current claim in question.

20 Claims, 5 Drawing Sheets

COMPUTER SYSTEM FOR APPLYING PROACTIVE REFERRAL MODEL TO LONG TERM DISABILITY CLAIMS

FIELD

The present invention relates to computer systems and more particularly to computer systems that apply proactive referral models.

BACKGROUND

U.S. Published patent application No. 2005/0276401, which names Madill, Jr., et al. as inventors, discloses a computer system that is pertinent prior art to the present invention. Among other functions, Madill's computer system may run software that appraises the likelihood that an insurance claim is fraudulent. One aspect of Madill's software encompasses a predictive model that compares a current claim with a fraud model generated from historical data that reflects past claims that were found to be fraudulent. In the one specific type of fraud model described in Madill's application, fraud patterns are detected among claimants, witnesses, medical providers, attorneys, repair facilities, etc.

The present inventor has recognized that the utility of a proactive referral model, for determining whether certain long term disability claims should be identified as potentially questionable and referred for special investigation, can be significantly enhanced by appropriate selection of certain variables to be used in building the proactive referral model.

SUMMARY

A computer system is disclosed which includes a data storage module. Functions performed by the data storage module include receiving, storing and providing access to claim data. The claim data stored by the data storage module represents historical and current long term disability claims.

The computer system further includes a proactive referral model component that is coupled to the data storage module and determines whether to identify a given one of the current claims for referral to an investigation unit. The proactive referral model is based on a plurality of variables. The variables include at least two of: (a) a variable that indicates that the claimant's diagnosis has changed; (b) a variable that indicates that the current claim in question was brought under any-occupation coverage; (c) a variable that reflects a market segment for a policy under which the current claim in question was brought; (d) a variable that has a value based on a state in which the claimant resides; and (e) a variable that represents an amount of experience of a claims handler who handled the current claim in question.

The computer system also includes a computer processor that executes programmed instructions and stores and retrieves the data related to current claims.

Further included in the computer system is a program memory, coupled to the computer processor, and which stores program instruction steps for execution by the computer processor.

A model training component is also included in the computer system. The model training component is coupled to the computer processor and trains the proactive referral model component based on the data related to the historical claims in accordance with program instructions stored in the program memory and executed by the computer processor. As a consequence, a trained proactive referral model component is provided.

Still further included in the computer system is an output device. The output device is coupled to the computer processor and outputs an output indicative of whether the current claim in question should be referred to an investigation unit. The computer processor generates the output in accordance with program instructions in the program memory and executed by the computer processor. The output is generated in response to application of data for the current claim in question to the trained proactive referral model component.

The computer system further includes a routing module which directs workflow based on the output from the output device.

The present inventor has discovered that it is beneficial to use two or more of the variables enumerated above in a proactive referral model to be applied to current long term disability claim data. The resulting proactive referral model provides an effective vehicle for identifying questionable long term disability claims for evaluation. This may increase an insurance company's overall ability to identify long term disability claims for further investigation.

As used herein, "proactive referral model" may refer to a predictive model that has been optimized to recommend long term disability claims for investigation.

With these and other advantages and features of the invention that will become hereinafter apparent, the invention may be more clearly understood by reference to the following detailed description of the invention, the appended claims, and the drawings attached hereto.

DETAILED DESCRIPTION

In general, and for the purposes of introducing concepts of embodiments of the present invention, a computer system incorporates a proactive referral model. The proactive referral model is trained with historical long term disability claim data. The proactive referral model is based on a novel set of variables that the inventor has found produces an efficient model. The proactive referral model is applied to current long term disability claims to determine whether the current claims should be referred to an investigation unit.

Figure 1:
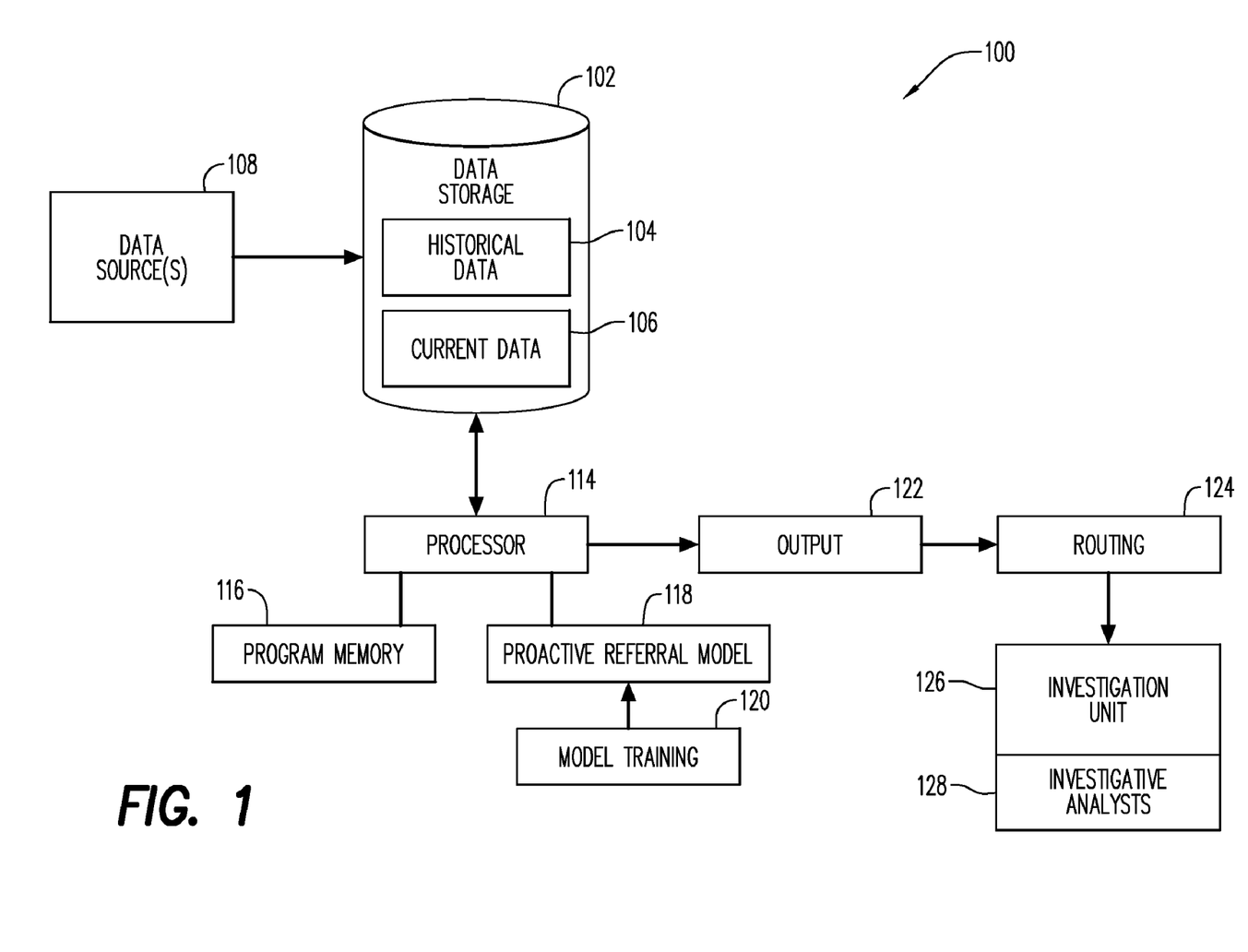
FIG. 1 is a partially functional block diagram that illustrates aspects of a computer system provided in accordance with some embodiments of the invention.

Features of some embodiments of the present invention will now be described by first referring to FIG. 1. FIG. 1 is a partially functional block diagram that illustrates aspects of a computer system 100 provided in accordance with some embodiments of the invention. For present purposes it will be assumed that the computer system 100 is operated by an insurance company (not separately shown) for the purpose of referring questionable long term disability claims to an investigation unit.

The computer system 100 includes a data storage module 102. In terms of its hardware the data storage module 102 may be conventional, and may be composed, for example, by one or more magnetic hard disk drives. In some embodiments, the data storage module 102 may take the form of a data warehouse. A function performed by the data storage module 102 in the computer system 100 is to receive, store and provide access to both historical long term disability claim data (reference numeral 104) and current long term disability claim data (reference numeral 106). As described in more detail below, the historical claim data 104 is employed to train a proactive referral model to provide an output that indicates whether a current long term disability claim should be referred to an investigation unit, and the current claim data 106 is thereafter analyzed by the proactive referral model. Moreover, as time goes by, and results become known from investigations of current claims, at least some of the current claims may be used to perform further training of the proactive referral model. Consequently, the proactive referral model may thereby adapt itself to changing patterns of questionable claims.

Both the historical claim data 104 and the current claim data 106 may include data concerning long term disability (e.g., group benefit) policies issued by the insurance company, and under which long term disability claims have been made. The historical claim data 104 and the current claim data 106 may also include electronic claim data files for the long term disability claims themselves. In some embodiments, additional data from sources outside of the insurance company (e.g., census data) may also be stored in the data storage module 102 for use in training and operating the proactive referral model. Sources for all of this data are represented at block 108 in FIG. 1. The historical claim data 104 may include data only for claims that have been investigated to a conclusion by a special investigation unit.

The computer system 100 also may include a computer processor 114. The computer processor 114 may include one or more conventional microprocessors and may operate to execute programmed instructions to provide functionality as described herein. Among other functions, the computer processor 114 may store and retrieve historical claim data 104 and current claim data 106 in and from the data storage module 102. Thus the computer processor 114 may be coupled to the data storage module 102.

The computer system 100 may further include a program memory 116 that is coupled to the computer processor 114. The program memory 116 may include one or more fixed storage devices, such as one or more hard disk drives, and one or more volatile storage devices, such as RAM (random access memory). The program memory 116 may be at least partially integrated with the data storage module 102. The program memory 116 may store one or more application programs, an operating system, device drivers, etc., all of which may contain program instruction steps for execution by the computer processor 114.

The computer system 100 further includes a proactive referral model component 118. In certain practical embodiments of the computer system 100, the proactive referral model component 118 may effectively be implemented via the computer processor 114, one or more application programs stored in the program memory 116, and data stored as a result of training operations based on the historical claim data 104 (and possibly also data resulting from training with current claims that have been investigated and found to be proper or improper). In some embodiments, data arising from model training may be stored in the data storage module 102, or in a separate data store (not separately shown). A function of the proactive referral model component 118 may be to identify current long term disability claims that should be referred to an investigation unit. The proactive referral model component 118 may be directly or indirectly coupled to the data storage module 102.

The proactive referral model component 118 may operate generally in accordance with conventional principles for proactive referral models, except, as noted herein, for at least some of the variables on which the proactive referral model component is based. Those who are skilled in the art are generally familiar with programming of proactive referral models. It is within the abilities of those who are skilled in the art, if guided by the teachings of this disclosure, to program a proactive referral model to operate as described herein.

Still further, the computer system 100 includes a model training component 120. The model training component 120 may be coupled to the computer processor 114 (directly or indirectly) and may have the function of training the proactive referral model component 118 based on the historical claim data 104. (As will be understood from previous discussion, the model training component 120 may further train the proactive referral model component 118 as further relevant claim data becomes available.) The model training component 120 may be embodied at least in part by the computer processor 114 and one or more application programs stored in the program memory 116. Thus the training of the proactive referral model component 118 by the model training component 120 may occur in accordance with program instructions stored in the program memory 116 and executed by the computer processor 114.

In addition, the computer system 100 may include an output device 122. The output device 122 may be coupled to the computer processor 114. A function of the output device 122 may be to provide an output that is indicative of whether (as determined by the trained proactive referral model component 118) a particular one of the current long term disability claims should be referred to an investigation unit. The output may be generated by the computer processor 114 in accordance with program instructions stored in the program memory 116 and executed by the computer processor 114. More specifically, the output may be generated by the computer processor 114 in response to applying the data for the current long term disability claim to the trained proactive referral model component 118. The output may, for example, be a number within a predetermined range of numbers. In some embodiments, the output device may be implemented by a suitable program or program module executed by the computer processor 114 in response to operation of the proactive referral model component 118.

Still further, the computer system 100 may include a routing module 124. The routing module 124 may be implemented in some embodiments by a software module executed by the computer processor 114. The routing module 124 may have the function of directing workflow based on the output from the output device. Thus the routing module 124 may be coupled, at least functionally, to the output device 122. In some embodiments, for example, the routing module may direct workflow by referring, to an investigation unit 126, current long term disability claims analyzed by the proactive referral model component 118 and found to warrant referral. In particular, these claims may be referred to investigative analysts 128 who are employed in the investigation unit 126. The investigation unit 126 may be a part of the insurance company that operates the computer system 100, and the investigative analysts may be employees of the insurance company.

Figure 2:
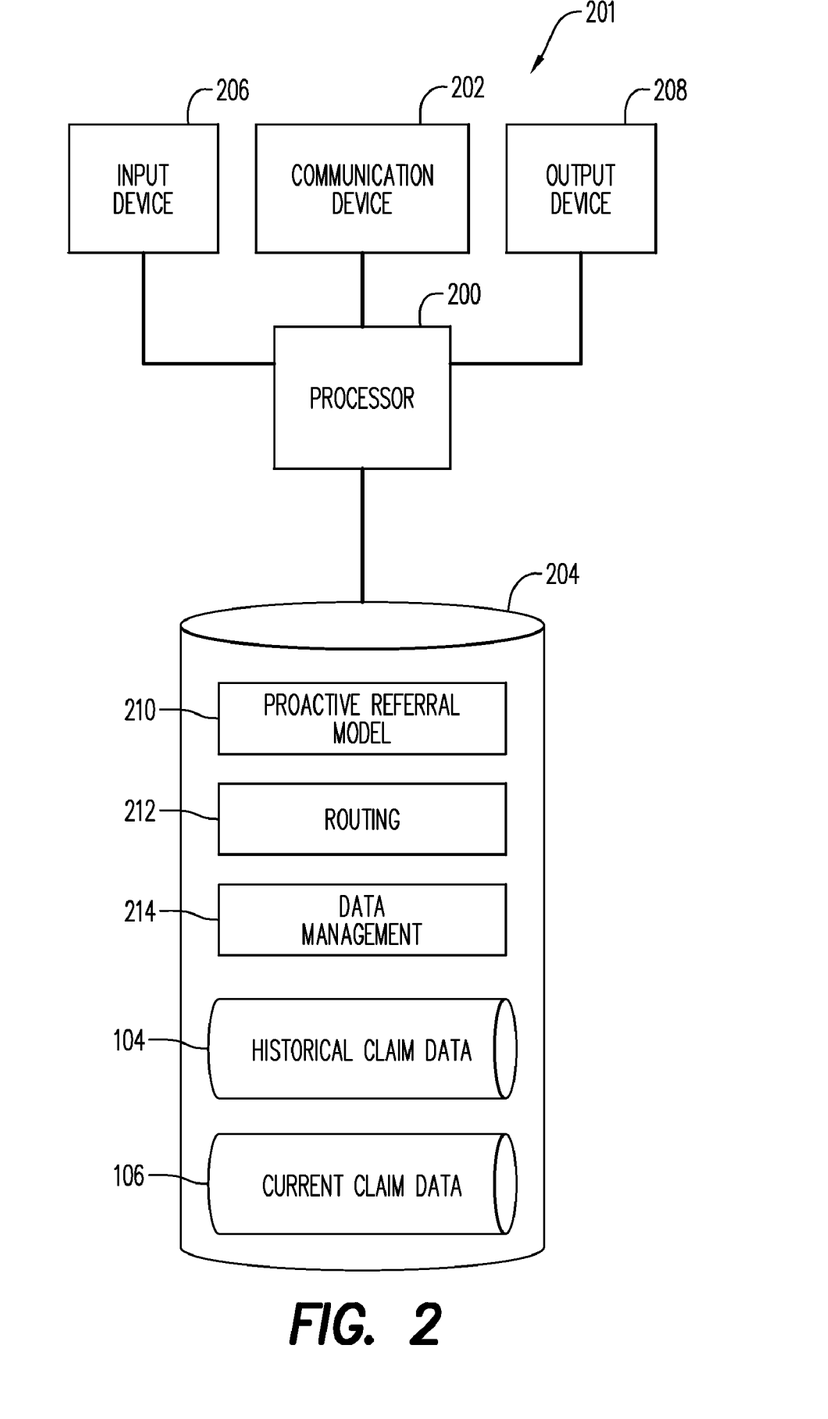
FIG. 2 is a block diagram that illustrates a computer that may form all or part of the system of FIG. 1.

FIG. 2 is a block diagram that illustrates a computer 201 that may form all or part of the system 100 of FIG. 1.

As depicted, the computer 201 includes a computer processor 200 operatively coupled to a communication device 202, a storage device 204, one or more input devices 206 and an output device 208. Communication device 202 may be used to facilitate communication with, for example, other devices (such as personal computers—not shown in FIG. 2—assigned to individual employees of the insurance company). The input device(s) 206 may comprise, for example, a keyboard, a keypad, a mouse or other pointing device, a microphone, knob or a switch, an infra-red (IR) port, a docking station, and/or a touch screen. The input device(s) 206 may be used, for example, to enter information. Output device 208 may comprise, for example, a display (e.g., a display screen) a speaker, and/or a printer.

Storage device 204 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

In some embodiments, the hardware aspects of the computer 201 may be entirely conventional.

Storage device 204 stores one or more programs or portions of programs (at least some of which being indicated by blocks 210-214) for controlling processor 200. Processor 200 performs instructions of the programs, and thereby operates in accordance with the present invention. In some embodiments, the programs may include a program or program module 210 that acts as a proactive referral model for determining whether to refer current long term disability claims to an investigation unit. The training function for the proactive referral model 210 is not indicated separately in FIG. 2 from the proactive referral model itself.

Another program or program module stored on the storage device 204 is indicated at block 212 and is operative to allow the computer 201 to route or refer current long term disability claims to insurance company employees as appropriate based on the results obtained by applying the proactive referral model 210 to the data which represents the current claim.

Still another program or program module stored on the storage device 204 is indicated at block 214 and engages in database management and like functions related to data stored on the storage device 204. There may also be stored in the storage device 204 other software, such as one or more conventional operating systems, device drivers, communications software, etc. The historical claim data 104 and the current claim data 106, as previously described with reference to FIG. 1, are also shown in FIG. 2 as being stored on the storage device 204.

Figure 3:
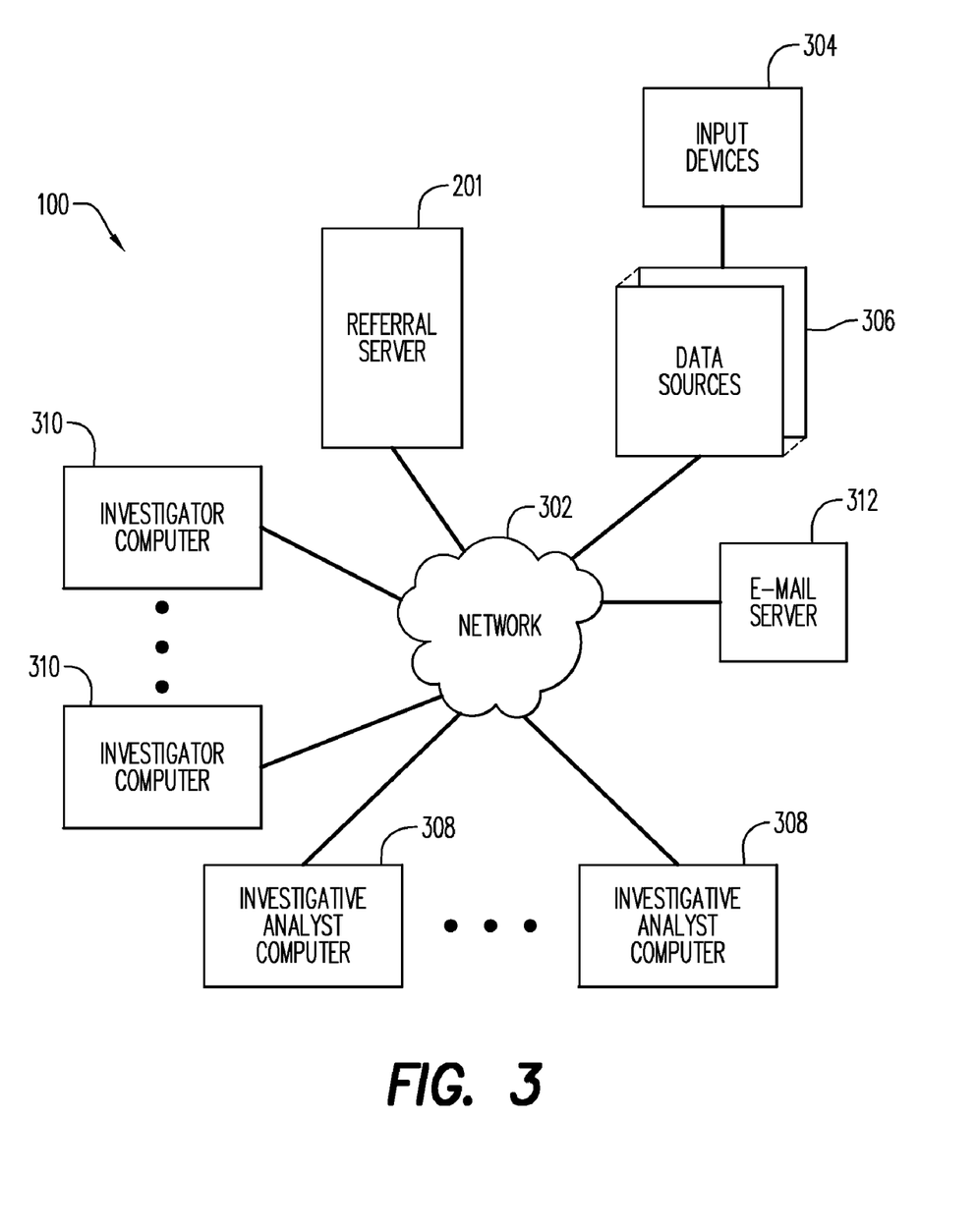
FIG. 3 is a block diagram that provides another representation of aspects of the system of FIG. 1.

FIG. 3 is another block diagram that presents the computer system 100 in a somewhat more expansive or comprehensive fashion (and/or in a more hardware-oriented fashion).

The computer system 100, as depicted in FIG. 3, includes the computer 201 of FIG. 2. The computer 201 is depicted as a "referral server" in FIG. 3, given that a function of the computer 201 is to selectively refer current long term disability claims to an investigation unit of the insurance company. As seen from FIG. 3, the computer system 100 may further include a conventional data communication network 302 to which the computer/referral server 201 is coupled.

FIG. 3 also shows, as parts of computer system 100, data input device(s) 304 and data source(s) 306, the latter (and possibly also the former) being coupled to the data communication network 302. The data input device(s) 304 and the data source(s) 306 may collectively include the device(s) 108 discussed above with reference to FIG. 1. More generally, the data input device(s) 304 and the data source(s) 306 may encompass any and all devices conventionally used, or hereafter proposed for use, in gathering, inputting, receiving and/or storing information for long term disability claim files and/or for files relating to policies that provide long term disability coverage.

Still further, FIG. 3 shows, as parts of the computer system 100, personal computers 308 assigned for use by investigative analysts (who are members of the investigation unit 126) and personal computers 310 assigned for use by investigators (also members of the investigation unit 126). The personal computers 308, 310 are coupled to the data communication network 302.

Also included in the computer system 100, and coupled to the data communication network 302, is an electronic mail server computer 312. The electronic mail server computer 312 provides a capability for electronic mail messages to be exchanged among the other devices coupled to the data communication network 302.

Thus the electronic mail server computer 312 may be part of an electronic mail system included in the computer system 100.

The computer system 100 may also be considered to include further personal computers (not shown), including, e.g., computers which are assigned to individual claim handlers or other employees of the insurance company.

Figure 4:
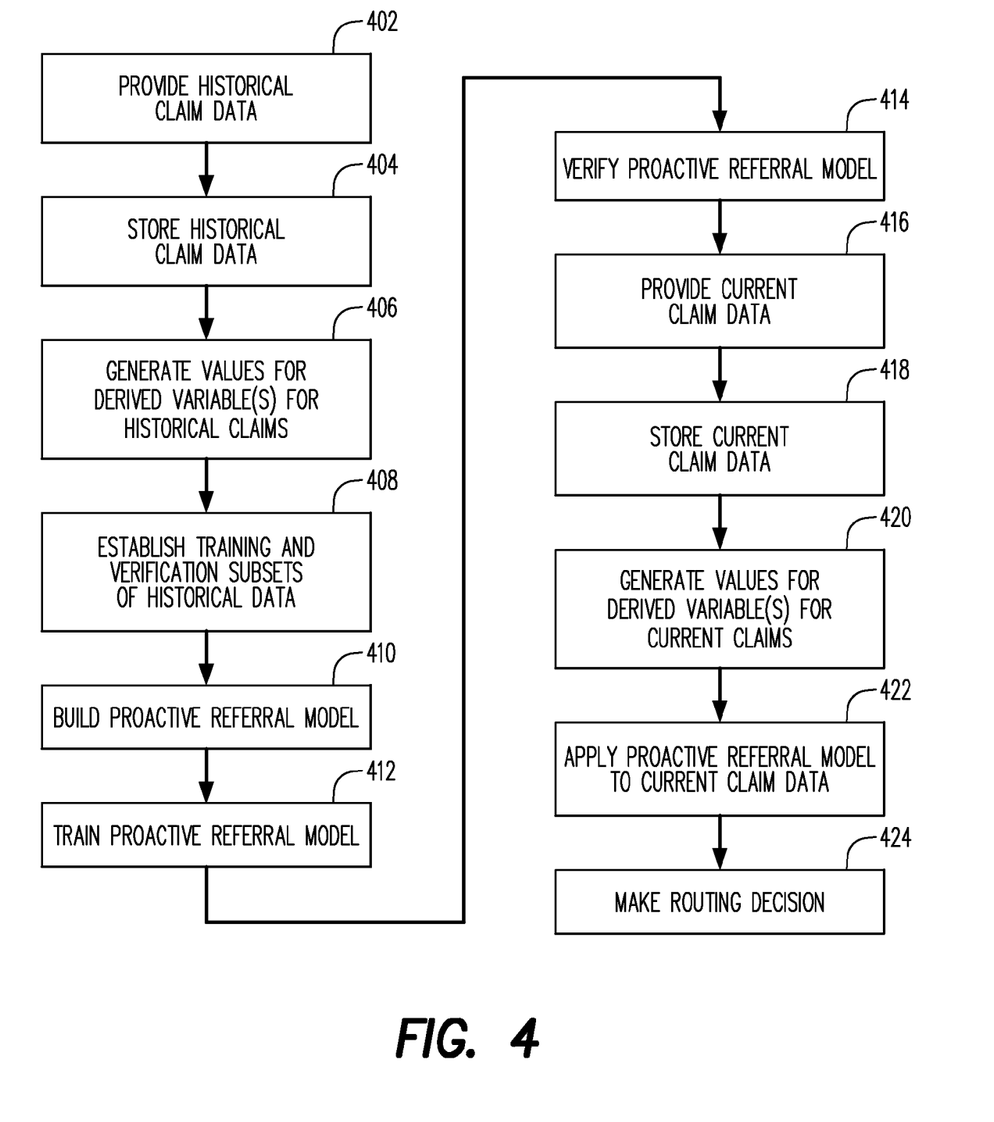
FIG. 4 is a flow chart that illustrates a process that may be performed in the computer system of FIGS. 1-3.

FIG. 4 is a flow chart that illustrates a process that may be performed in the computer system 100/computer 201 of FIGS. 1-3.

At 402 in FIG. 4, historical long term disability claim data is provided to the computer 201. As noted above, this data may, in some embodiments, relate only to long term disability claims that have been investigated to a conclusion. For claims for which the available data is incomplete, missing data may be entered manually to provide complete data files. The term historical claim data should be understood broadly as referring not just to the electronic claim files for long term disability claims, but also as including the electronic files relating to policies under which the long term disability claims were made. The claim files may include personal, demographic and household information relating to the claimants. The demographic information may include location of residence (e.g., by zip code and/or state), age, gender, dependents, income, marital status and education level. The personal information may include behavioral information that indicates measures of the claimant's actions or behavior, such as number of insurance claims filed, or the number of bankruptcies filed. In some embodiments, the personal information may include psychographic data, such as information about the claimant's opinions or values.

The claim files may include systemic data such as time stamps as to when the claims were received, dates of activity by insurance company employees with respect to the claims and automated claim diaries. The policy information may include sales and policyholder information (it will be noted that the policyholder may be an employer or former employer of the claimant). The policy information may also indicate how the policy in question defines disability. For example, the policy may define disability as being unable to perform the claimant's occupation, or alternatively as being unable to perform any occupation. The latter type of coverage is referred to as "any-occupation" coverage. The policy information may also indicate a market segment into which the policy was sold.

The historical data may also include information regarding the claims handling employees ("claim handlers") who handled the long term disability claims in question.

Other types of information included in the claim files may include the claimant's diagnosis and one or more codes for the diagnosis, any previous diagnosis for the claimant, the amount of periodic (e.g., monthly) benefits that the insurance company paid to the claimant, the claimant's occupation prior to the claim, a class of occupations that includes the claimant's occupation, an indication as to whether the disability claim arose from accident, sickness or pregnancy, and an indication as to whether the claimant has been determined to be disabled for purposes of Social Security benefits.

All of the types of data listed above may be provided from electronic records maintained by the insurance company. In some embodiments, additional data may be obtained from external sources in connection with proactive referral modeling activities. Such external data may, for example, include census data and/or other statistics collected by government or industry agencies. Examples of such data may be unemployment rate by zip code, crime rate by zip code, or standard expected duration for disability claims by diagnosis code.

For the historical claims, the data may also indicate the results of the investigation into the claim—e.g., whether the result of the investigation "impacted" the claim by terminating or reducing the benefit paid.

Each type of information that is available for the claims may be considered to represent a variable that at least potentially has predictive value as to whether it would be desirable to refer the claim for investigation by the investigation unit.

At 404, the historical claim data may be stored in the computer system 100/computer 201, e.g., in a data warehouse that serves the entire insurance company or at least the division that issued the long term disability coverage.

At 406, the computer system 100/computer 201 performs processing to generate values for variables that are to be derived from the variables represented by the available data. Such variables may be referred to as "derived variables".

One derived variable may represent the amount of experience of the claims handler who handled the claim in question. This variable may be calculated by subtracting, from the date of notice of claim, the date on which the claims handler began handling long term disability claims.

Other examples of possible derived variables may include the length of time the claimant was employed by the same employer prior to making the disability claims, or the length of employment by the claimant prior to claim divided by the claimant's age. The claimant's age at the time of claim may be derived by subtracting the claimant's date of birth from the date of notice of claim. Another derived variable may be the length of disability.

Still other types of derived variables may be constructed as subcategories of diagnosis codes that may be highly likely to experience questionable claims.

At 408, two mutually exclusive subsets of the historical claim transactions are formed. One of the two subsets is to be used for training the proactive referral model. The other of the two subsets is to be used for verifying the proactive referral model after it has been trained.

At 410, a designer of the proactive referral model may use the training subset of the historical claim data to build the proactive referral model. One technique that the designer may use is backward variable reduction, which is also referred to as backward regression variable selection. According to this technique, one or more statistical measures—e.g., the r squared value, the t-stat value and the P-value—may be evaluated to measure the predictive power of each original and derived variable. The designer may then remove those variables that, according to the statistical measure or measures, had little or no predictive power. In one embodiment, the following set of variables was selected by backward regression variable selection, all of these variables having exhibited strong ability to predict whether referral for investigation was warranted: (a) the geographical state in which the claimant resides being a state that has a high rate of questionable disability claims; (b) the geographical state in which the claimant resides being a state that has a low rate of questionable disability claims; (c) the claimant's diagnosis code being one which exhibits a high rate of questionable disability claims; (d) whether the claimant is represented by an attorney; (e) a change in the claimant's diagnosis; (f) an amount of experience of the claims handler; (g) the claim having been brought under any-occupation coverage; (h) whether the claimant has been classified as disabled for purposes of Social Security benefits; (i) whether the claimant's occupation was classified as sedentary; (j) the market segment for the policy under which the claim was brought; (k) whether the claim was the subject of a buyout settlement; (l) whether the claimant's diagnosis code was in a subcategory that was highly likely to experience questionable claims; (m) the claimant's employer having an SIC (standard industrial classification) code that is highly likely to experience questionable claims; and (n) the duration of the claim.

The regression analysis used to select the variables for the proactive referral model may be multiple linear regression.

At 412, the proactive referral model is trained using the training subset of historical claim data. In some embodiments, for example, the proactive referral model may be trained by using one or more types of regression analysis. It may be considered that the variable selection process described in connection with step 410 constitutes at least a portion of the training of the proactive referral model, such that step 412 may at least partially overlap with step 410. The training process may also include testing the efficacy of the proactive referral model against the training subset of the historical claim data.

As an alternative to regression analysis, other types of pattern detection analysis may be applied to the training subset of the historical claim data. As another alternative, the proactive referral model may be implemented as a neural network. In some embodiments, the proactive referral model is of a kind that, for each claim to which it is applied, the model generates a numerical output within a certain range. The output may be generated in such a manner that a higher output implies a higher likelihood that it would be worthwhile to refer the claim for special investigation.

After training of the proactive referral model, it is verified, as indicated at 414, by applying the model to the other subset of historical claim data. The results of the verification processing are analyzed to confirm that the proactive referral model performs effectively in generally assigning higher outputs to the claims in the other subset that actually had been determined to be improper.

At 416 in FIG. 4, data concerning current claims is provided to the computer system 100/computer 201. Preferably the data for the current claims is of the same kinds as the data for the historical claims, as described above in connection with step 402. The current claim data may be loaded into the computer 201 from the above-mentioned data source(s) 108.

At 418, the current claim data may be stored in the computer system 100/computer 201.

At 420, the computer system 100/computer 201 performs processing to generate values—for the current claims—for any derived variables that remain in the proactive referral model after selection of variables. The values for these derived variables may be generated in the same manner as in the case of the processing for those derived variables in connection with step 406. The values of the derived variables are then stored as part of the current claim data.

At 422, the proactive referral model is applied to the current claim data, for one of the current claims. (One could also say that the current claim data is applied to the proactive referral model.) The operation of the proactive referral model results in an output being generated for the current claim in question. As indicated by previous discussion, the output is indicative of a determination by the proactive referral model as to the likelihood that the current claim should be identified as potentially questionable, with a higher output indicating a greater likelihood that the claim is questionable.

At 424 in FIG. 4, the computer 201 makes a routing decision with respect to the current claim applied to the proactive referral model at 422. This decision is based on the output generated from the proactive referral model for the current claim transaction in question. From ensuing discussion, it will be understood that the routing decision may be whether to refer the current claim transaction in question to the insurance company's investigation unit.

Figure 5:
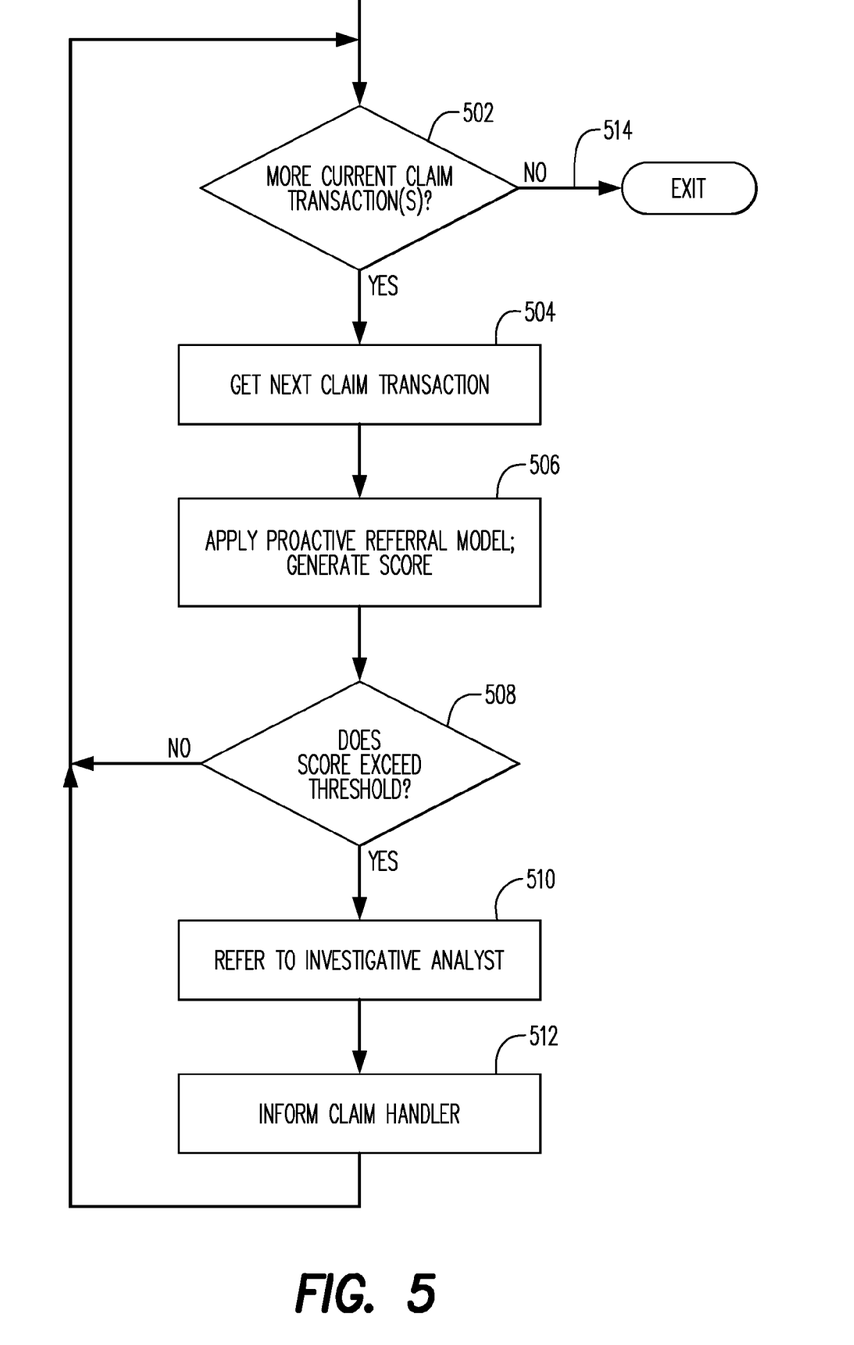
FIG. 5 is a flow chart that illustrates aspects of the process of FIG. 4.

FIG. 5 is a flow chart that illustrates additional details of the process of FIG. 4.

The process of FIG. 5 begins with decision block 502. At decision block 502 the computer system 100/computer 201 determines whether there are any current claims that are to be considered for possible referral to the investigation unit. In some embodiments, the current claims that are to be considered for possible referral are selected on a regular basis according to pre-determined criteria. For example, current long term disability claims that have at least a given duration, and that have not been considered for referral in the last three months, may be considered by the proactive referral model for possible referral.

If there is at least one such current claim, then block 504 follows decision block 502. At 504, the computer system 100/computer 201 accesses the next current claim that is subject to consideration for referral. Then, at 506, the computer system 100/computer 201 applies the proactive referral model to the current claim accessed at 504. From previous discussion it will be recognized that the application of the proactive referral model to the current claim transaction in question results in the computer system 100/computer 201 generating an output for the current claim in question, where the output is indicative of whether it is advisable that the current claim in question should be referred to the investigation unit 126.

Decision block 508 follows block 506. At decision block 508, the computer system 100/computer 201 determines whether the output generated at 506 exceeds a predetermined threshold. The threshold may, for example, have been set at the time that the training of the proactive referral model was verified (block 414, FIG. 4). The threshold may have been set in such a manner as to balance the potentially conflicting goals of avoiding false positive indications, while avoiding false negative determinations. The achievement of this balance may reflect the respective levels of outputs generated by the proactive referral model during verification processing to proper and improper historical claims. In other cases, the threshold may be adjusted at the time of performing the process of FIG. 5 to reflect the relative scarcity or availability of resources in the investigation unit 126.

If it is determined at decision block 508 that the output generated at 506 exceeds the threshold, then block 510 follows decision block 508. At block 510, the computer system 100/computer 201 may refer the current claim in question to an investigative analyst in the insurance company's investigation unit. This may be done by the computer system 100/computer 201 automatically e-mailing the electronic case file for the claim to the investigative analyst. If more than one investigative analyst is available to receive the referral of the claim, then the computer system 100/computer 201 may automatically select the investigative analyst who is to receive the referral based on one or more factors such as one or more attributes of the claim, the investigative analyst's qualifications and/or experience, the investigative analyst's current workload, etc. The investigative analyst's role, at this point, is to review the claim, confirm that the referral is warranted, proceed with a desk analysis/investigation of the claim, and, if field investigation is then found to be warranted, refer the claim on to a field investigator for further investigation.

In some embodiments, the computer system 100/computer 201 may cause the claims referred to each investigative analyst, and/or to the investigation unit as a whole, to be queued according to the outputs generated for the claims at step 506. That is, claims having higher outputs assigned by the proactive referral model may be placed higher in the individual investigative analysts' queues and/or in the investigation unit's queue.

Block 512 may follow block 510. At block 512 the computer system 100/computer 201 automatically notifies the claims handler to whom the claim is assigned that the claim was being referred to the investigation unit. At the same time, the computer system 100/computer 201 may inform other interested branches of the insurance company that the claim is being referred to the investigation unit.

After block 512, the process of FIG. 5 loops back to decision block 502 to determine whether there are other current claims to be analyzed by the proactive referral model. If, at a point when decision block 502 is reached, there are no more claims to be analyzed, then the process of FIG. 5 ends, as indicated at branch 514.

As noted above, in some embodiments, when the proactive referral model indicates that a current claim should be referred to the investigation unit, the current claim may be referred to an investigative analyst. In other embodiments, however, the current claim may be referred directly to a field investigator. Nevertheless, it may be preferable to make claim referrals for investigation by an investigative analyst. The investigative analyst may take steps such as confirming that the referral for investigation is appropriate, planning and executing a "desk investigation" of the claim, and making a further referral to a field investigator if warranted. If the referral for investigation was not appropriate, the investigative analyst may refrain from investigating the claim (possibly with an explanation why the investigative analyst considered that the claim should not be investigated by the investigation unit at the time). If the referral was appropriate, the investigative analyst may proceed with a desk investigation, and may report the results of his/her investigation to the claims handler.

The investigation unit may perform various types of investigations, including investigations related to possible fraud.

The present inventor has found that a proactive referral model based on the set of variables enumerated above in connection with step 410 produces better results, at lower cost, than manual review of long term disability claims for possible referral to the investigation unit. By better results, it is meant that the long term disability claims recommended for referral by the proactive referral model are substantially more likely to be found to warrant investigation than claims recommended for referral based on manual review.

In some embodiments, the investigation unit may receive referrals via other channels than referral based on a proactive referral model. For example, referrals may also be from claim handlers, or from outside sources, such as the National Insurance Crime Bureau (NICB), etc. Other referrals for investigation may take place selectively/pro-actively based on other sources when suspicious claims or patterns of questionable claims are identified.

In some embodiments, a given current long term disability claim may be periodically resubmitted for analysis by the proactive referral model. Part of the process of resubmission may include determining whether the value of a variable has changed. In some embodiments, the indication that the variable has changed in value may be a derived variable. For example, in some embodiments, a derived variable may indicate whether the claimant's diagnosis has changed.

In some embodiments, the claim data may include information extracted by data mining from free form text files included in the electronic claim files. A data extraction component (e.g., a software module) may control the processor 200 to extract the information from the text files.

In some embodiments, some or all of the above-mentioned communications among investigative analysts, claims handlers, and field investigators may be via the electronic mail system referred to above in conjunction with FIG. 3.

The process descriptions and flow charts contained herein should not be considered to imply a fixed order for performing process steps. Rather, process steps may be performed in any order that is practicable.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A computer system comprising:
a data storage module for receiving, storing, and providing access to claim data, the claim data representing historical and current long term disability claims;
a proactive referral model component, coupled to the data storage module, for determining whether to identify a one of said current claims for referral to an investigation unit, said proactive referral model based on a plurality of variables, the variables including at least two of: (a) a variable that indicates that a claimant's diagnosis has changed; (b) a variable that indicates that the one of said current claims was brought under any-occupation coverage; (c) a variable that reflects a market segment for a policy under which the one of said current claims was brought; (d) a variable that has a value based on a state in which the claimant resides; and (e) a variable that represents an amount of experience of a claims handler who handled the one of said current claims;
a computer processor for executing programmed instructions and for storing and retrieving said data related to current claims;
program memory, coupled to the computer processor, for storing program instruction steps for execution by the computer processor;
a model training component, coupled to the computer processor, for training the proactive referral model component based on the data related to the historical claims in accordance with program instructions stored in the program memory and executed by the computer processor, thereby providing a trained proactive referral model component;
an output device, coupled to the computer processor, for outputting an output indicative of whether said one of said current claims should be referred to the investigation unit, wherein the computer processor generates the output in accordance with program instructions in the program memory and executed by the computer processor, said output generated in response to application of data for said one of said current claims to the trained proactive referral model component; and
a routing module for directing workflow based on the output from the output device.

2. The computer system of claim 1, wherein the routing module routes said one of the current claims to the investigation unit based on the output from the output device.

3. The computer system of claim 2, wherein the routing module routes said one of the current claims to an investigative analyst in the investigation unit.

4. The computer system of claim 1, wherein the data storage module includes a data warehouse.

5. The computer system of claim 1, wherein the proactive referral model component was built using multiple linear regression.

6. The computer system of claim 1, wherein the proactive referral model component was built using backward regression variable selection.

7. A computer system comprising:
a data storage unit for receiving, storing and providing access to historical claim data and current claim data, the historical claim data representing historical long term disability (LTD) claims, the current claim data representing current LTD claims;
a computer processor in communication with the data storage unit; and
a program memory, coupled to the computer processor, for storing at least one application program, the at least one application program including program instruction steps for execution by the computer processor, the at least one application program including:
a proactive referral model that has been trained on and verified with the historical claim data and that controls the computer processor to analyze the current claim data in the data storage unit and to provide a respective output for each current claim represented by the current claim data, the respective output indicating whether said each current claim should be referred to an investigation unit; and
a routing component, responsive to the respective output for each of the current claims, for selectively routing ones of the current claims to the investigation unit;
wherein said proactive referral model is based on a plurality of variables, the variables including at least two of: (a) a variable that indicates that a claimant's diagnosis has changed; (b) a variable that indicates that the one of said current claims was brought under any-occupation coverage; (c) a variable that reflects a market segment for a policy under which the one of said current claims was brought; (d) a variable that has a value based on a state in which the claimant resides; and (e) a variable that represents an amount of experience of a claims handler who handled the one of said current claims.

8. The computer system of claim 7, wherein the computer processor, under control by the routing component, routes ones of the current claims via electronic mail messages to the investigation unit.

9. The computer system of claim 8, wherein investigative analysts in the investigation unit are recipients of the electronic mail messages.

10. The computer system of claim 7, wherein the at least one application program includes:

a data extraction component for controlling the computer processor to extract information from text files.

11. The computer system of claim 7, wherein the data storage unit includes a data warehouse.

12. The computer system of claim 7, wherein the proactive referral model was built using multiple linear regression.

13. The computer system of claim 7, wherein the proactive referral model was built using backward regression variable selection.

14. A method of operating a computer system, the method comprising:
   storing historical claim data in the computer system, the historical claim data representing historical long term disability (LTD) claims;
   processing the historical claim data to generate values for a derived variable, the derived variable indicative of whether a non-derived variable has changed in value for a given LTD claim;
   building a proactive referral model using the derived variable;
   verifying by computer the proactive referral model with a subset of the historical claim data;
   storing current claim data in the computer system, the current claim data representing current LTD claims;
   processing the current claim data to generate values of the derived variable with respect to the current LTD claims;
   applying the trained and verified proactive referral model to the current claim data and to the values of the derived variable generated with respect to the current LTD claims, to generate a respective output for each of the current LTD claims; and
   selectively routing ones of the current LTD claims to an investigative unit based on the outputs generated by the proactive referral model.

15. The method of claim 14, wherein the non-derived variable represents a diagnosis received by a claimant in the given LTD claim.

16. The method of claim 14, wherein the ones of the current LTD claims are routed to investigative analysts in the investigation unit.

17. The method of claim 14, further comprising:
   using multiple linear regression to build the proactive referral model.

18. The method of claim 14, further comprising:
   using backward regression variable selection to build the proactive referral model.

19. The method of claim 14, further comprising:
   periodically reapplying the proactive referral model to current LTD claims to which the proactive referral model has previously been applied.

20. The method of claim 19, wherein said reapplying includes detecting changes in said non-derived variable.

* * * * *